US008321645B2

(12) United States Patent  
Rabii et al.

(10) Patent No.: US 8,321,645 B2
(45) Date of Patent: Nov. 27, 2012

(54) MECHANISMS FOR MOVING DATA IN A HYBRID AGGREGATE

(75) Inventors: Faramarz Rabii, Ashland, MA (US); John Strunk, Cary, NC (US); Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 639 days.

(21) Appl. No.: 12/432,649

(22) Filed: Apr. 29, 2009

(65) Prior Publication Data

US 2010/0281230 A1 Nov. 4, 2010

(51) Int. Cl.
G06F 12/00 (2006.01)
G06F 13/00 (2006.01)
G06F 13/28 (2006.01)

(52) U.S. Cl. ......... 711/165; 711/E12.001; 711/E12.002; 711/170; 711/117

(58) Field of Classification Search .................. 711/103, 711/112, 117, 165, 170, E12.001, E12.002, 711/E12.008
See application file for complete search history.

(56) References Cited

U.S. PATENT DOCUMENTS

| 5,276,867 | A | 1/1994 | Kenley et al. |
|---|---|---|---|
| 5,819,292 | A | 10/1998 | Hitz et al. |
| 5,991,542 | A | 11/1999 | Han et al. |
| 6,212,531 | B1 | 4/2001 | Blea et al. |
| 6,272,611 | B1 | 8/2001 | Wu |
| 6,289,356 | B1 | 9/2001 | Hitz et al. |
| 6,567,803 | B1 | 5/2003 | Ramasamy et al. |
| 6,895,413 | B2 | 5/2005 | Edwards |
| 7,099,892 | B1 | 8/2006 | Luo et al. |
| 7,107,385 | B2 | 9/2006 | Rajan et al. |
| 7,328,318 | B1 | 2/2008 | Burriss et al. |
| 7,664,791 | B1 | 2/2010 | Hamilton |
| 2002/0083037 | A1 | 6/2002 | Lewis et al. |
| 2003/0126132 | A1 | 7/2003 | Kavuri et al. |
| 2003/0229656 | A1 | 12/2003 | Hitz et al. |
| 2004/0139273 | A1 | 7/2004 | Doucette et al. |
| 2006/0004816 | A1 | 1/2006 | Diewald et al. |
| 2006/0020580 | A1 | 1/2006 | Dettinger et al. |
| 2006/0236047 | A1 | 10/2006 | Shitomi |
| 2007/0083575 | A1* | 4/2007 | Leung et al. .................. 707/205 |

(Continued)

OTHER PUBLICATIONS

Wilkes, et al. "The HP autoRAID hierarchical storage system." ACM Transactions on Computer Systems, vol. 14, No. 1 (Feb. 1996).
International Search Report PCT/US2010/032938 dated Nov. 26, 2010; pp. 1-3.

(Continued)

*Primary Examiner* — J. H. Hur
(74) *Attorney, Agent, or Firm* — Perkins Coie LLP

(57) ABSTRACT

At least certain embodiments include a method, system and apparatus for relocating data between tiers of storage media in a hybrid storage aggregate encompassing multiple tiers of heterogeneous physical storage media including a file system to automatically relocate the data between tiers. The hybrid storage aggregate includes one or more volumes, each volume including a volume block number space spanning at least a first-tier of storage media and a second tier of storage media of the multiple tiers of heterogeneous physical storage media and the hybrid storage aggregate further includes a control module to cooperatively manage the tiers of the multiple tiers of heterogeneous physical storage media and a file system coupled with the control module, the file system including a policy module configured to make policy decisions based on a set of one or more policies and configured to automatically relocate data between different tiers of the multiple tiers of heterogeneous physical storage media based on the set of policies.

31 Claims, 10 Drawing Sheets

U.S. PATENT DOCUMENTS

2007/0180257 A1    8/2007  Bae et al.
2008/0288714 A1*  11/2008  Salomon et al. .............. 711/103
2009/0265506 A1*  10/2009  Yim .............................. 711/103

OTHER PUBLICATIONS

Written Opinion PCT/US2010/032938 dated Nov. 26, 2010; pp. 1-4.
"SnapshotTM Technology", www.netapp.com, Oct. 11, 2004, http://web.archive.org/web/20041011104545/http://www.netapp.com/products/snapshot.html.
"Data ONTAPTM Software," www.netapp.com, Oct. 12, 2004, http://web.archive.org/web/20041012081308/http://www.netapp.com/products/filer/ontap.html.
ZFS: the last word in the file systems,: www.sun.com, Sep. 14, 2004, http://www.sun.com/2004-0914/feature/.
Co-pending U.S. Appl. No. 11/260,653, filed Oct. 26, 2005.
Non-Final Office Action Mailed Nov. 14, 2007 in Co-pending U.S. Appl. No. 11/260,653, filed Oct. 26, 2005.
Final Office Action Mailed Oct. 27, 2008 in Co-pending U.S. Appl. No. 11/260,653, filed Oct. 26, 2005.
Non-Final Office Action Mailed Apr. 6, 2009 in Co-pending U.S. Appl. No. 11/260,653, filed Oct. 26, 2005.
Notice of Allowance Mailed Oct. 7, 2009 in Co-pending U.S. Appl. No. 11/260,653, filed Oct. 26, 2005.

* cited by examiner

MECHANISMS FOR MOVING DATA IN A HYBRID AGGREGATE

FIELD OF THE INVENTION

At least one embodiment relates to data storage servers, and more specifically, to relocation of data among multiple tiers of heterogeneous physical storage media.

BACKGROUND OF THE INVENTION

A storage server is a computer that provides storage service relating to the organization of data on writable, storage media, such as non-volatile memories and disks. The storage server may be configured to operate according to a client/server model of information delivery to enable many clients (e.g., applications) to access the data served by the system. The storage server can employ a storage architecture that serves the data with both random and streaming access patterns at either a file level, as in network attached storage (NAS) environments, or at the block level, as in a storage area network (SAN).

Storage servers store data on various types of non-volatile storage media such as, for example, relatively high latency (i.e., longer access times) hard disk drive devices (HDDs) and relatively low latency (i.e., shorter access times) solid-state devices (SSDs). Access time (or latency) is the period of time required to retrieve data from a storage device. In HDDs, disk access time is determined by the sum of the spin-up time, the seek time, rotational delay and data transfer time. Spin-up time is the time required to accelerate a disk to operating speed. Seek time is the time for the access arm to reach the desired disk track. Rotational delay is the delay for the rotation of the disk to bring the required disk sector under the read-write mechanism and generally depends on rotational speed of a disk measured in RPMs. Data transfer time is a time during which data is actually read or written to/from a storage medium at a certain bandwidth.

HDDs store digitally encoded data on rapidly rotating platters with magnetic surfaces. However, HDDs access data mechanically, and therefore, access times in HDDs can be relatively slow because of mechanical delays. As a result, HDDs generally provide good streaming performance (e.g., reading of large sequential blocks or "track reads") but do not perform well on random access (i.e., reading and writing of individual disk sectors) due to slow access times. SSDs on the other hand, are more suitable for random and frequent memory accesses because of the relatively low latency. SSD data storage devices use solid-state memory, such as non-volatile flash memory to store persistent data. With no moving parts, solid-state devices do not have mechanical delays resulting in the high latency experienced by HDDs and seek time is decreased significantly, making the SSDs very fast. SSD memory has this and other advantages over traditional disk drives. However, SSD memories are generally more expensive than HDD memories and have a shorter operational lifetime due to wear and other degradation.

One way to improve performance of a storage server is through the use of hybrid storage media, e.g., by intermixing relatively expensive electronic storage, such as SSDs, with relatively inexpensive magnetic storage, such as HDDs, to provide a total storage space of the system. Typically, users or administrators of such storage servers identify and isolate frequently accessed (i.e., "hot") data that could most benefit from being stored in the faster SSDs, with the remaining data being stored on the HDDs. However, identification and isolation of such hot data is normally performed and enforced manually, thus requiring time-consuming levels of effort by administrators. In addition, administrators of such storage servers can make decisions to configure the physical layout of the SSDs and HDDs to create one or more volumes, where each volume has a logical arrangement of block numbers, known as logical block numbers (LBNs), used to organize data. The administrators may then render decisions to employ static or fixed allocations of the data. For example, the data associated with a first range of LBNs may be placed in one group of storage based on SSDs, while data associated with a second range of LBNs may be placed in another group of storage based on HDDs. However, implementation of such fixed data allocation decisions is time-consuming and expensive, particularly when changes are made to the allocations.

SUMMARY

Embodiments of the technique introduced here include a method, system and apparatus for automatically relocating blocks of data among different tiers of storage media in a hybrid storage aggregate encompassing multiple tiers of heterogeneous storage media. A hybrid storage aggregate is defined as a logical aggregation of heterogeneous physical storage (i.e., a logical container for a pool of storage combining one or more physical mass storage devices of different storage media technologies or parts thereof into a single logical storage object), which contains or provides storage for one or more other logical datasets. In one embodiment, the logical aggregation of physical storage includes one or more volumes, where the logical arrangement of block numbers for each volume is a volume block number (VBN) space where each volume has a contiguous VBN space spanning across tiers of the multiple tiers of heterogeneous storage media.

Embodiments provide for automatically relocating the blocks of data among the multiple tiers of storage media by examining data within the hybrid storage aggregate using a policy module based on a set of policies, determining whether the data is to be relocated to a different tier of physical storage media based on the set of policies, and relocating the data to the different tier of storage media. In one embodiment, the set of policies include an access-based policy to relocate data among the tiers of storage media based on the frequency and randomness of accesses a particular block of data is experiencing. The set of policies also includes a capacity-based policy to relocate data from tiers of storage media with scarce storage capacity to tiers with more available storage capacity. In at least one embodiment, the set of policies are dynamically adjusted at run-time to improve the performance characteristics of the hybrid storage aggregate.

BRIEF DESCRIPTION OF THE DRAWINGS

A better understanding of at least certain embodiments of the invention can be obtained from the following detailed description in conjunction with the following drawings, in which.

DETAILED DESCRIPTION

Figure 1:
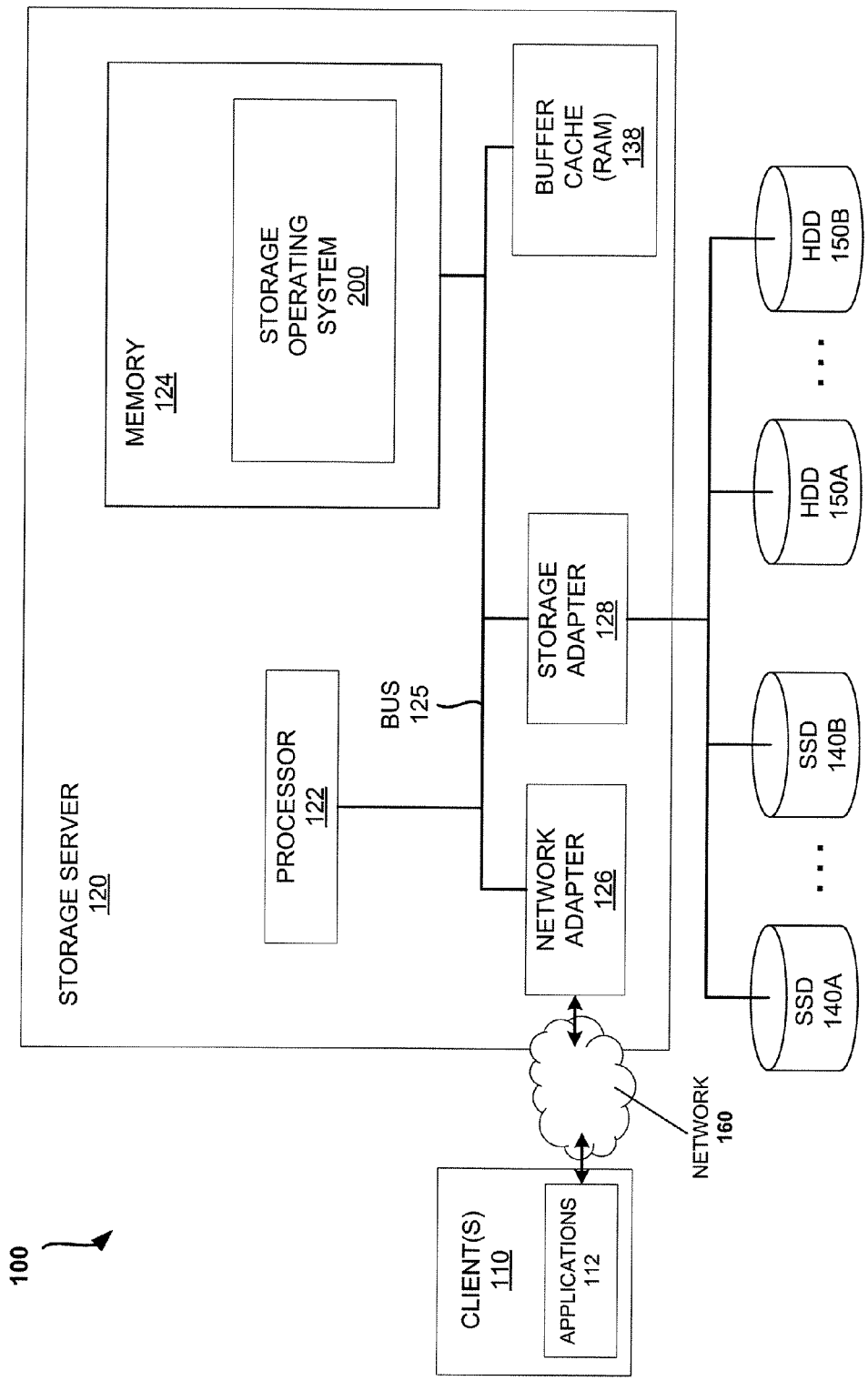
FIG. 1 illustrates a block diagram of a storage server that can be advantageously used to implement illustrative embodiments of the invention.

At least one embodiment includes a hybrid media storage architecture having a storage manager including a file system, the storage manager configured to control multiple tiers of heterogeneous storage media in a hybrid storage aggregate. An aggregate is defined as a logical aggregation of physical storage, i.e., a logical container for a pool of storage combining one or more physical mass storage devices or parts thereof into a single logical storage object, which contains or provides storage for one or more other logical datasets at a higher level of abstraction (e.g., volumes). A file system is defined as a structured (e.g., hierarchical) set of stored files, directories and/or other data containers. In the hybrid storage aggregate described herein, each tier of the multiple tiers of heterogeneous storage media includes a different physical storage media technology. The term "heterogeneous storage media" as used in this description is defined as a storage media comprising two or more tiers of storage media of different storage media technologies. The different storage media technologies may include, for example, any two or more of: hard disks such as SATA and Fiber Channel; magnetic tape storage media; microelectromechanical systems (MEMS)-based storage media; optical storage media including optical memory cards; and various solid state technologies (such as Flash memory and various improvements thereof, Ferroelectric RAM, Magnetic Ram, Racetrack memory, Resistive RAM, Solid Electrolyte, or PC-RAM). For example, a hybrid storage aggregate may be any combination of two or more different storage media technologies such as HDDs/SSDs, HDDs/MEMS, SSDs/MEMS, SSDs/Optical, SSDs/MEMS/Optical, SSDs/HDDs/MEMS, SSDs/Optical/MEMS, and so on.

The multiple tiers of storage media of the hybrid storage aggregate include at least a first-tier and a second-tier of storage media from different physical storage media technologies where, for example, the first-tier of storage media includes writeable, persistent storage media with certain performance characteristics superior to those of the second-tier of storage media. In one embodiment, the first-tier of storage media includes lower latency storage media than the second-tier of storage media. This is advantageous since the first-tier of storage media may be used for data that is frequently and/or randomly accessed from the hybrid storage aggregate and the second-tier of storage media may be used for mass storage of data that is either infrequently accessed or sequentially accessed from the hybrid storage aggregate.

At least one embodiment includes a policy module to make the determination as to which storage media a given set of data should reside within based on a set of policies. For example, the tiers of the multiple tiers of storage media may include relatively expensive, lower latency electronic storage media such as solid-state devices (SSDs) and relatively inexpensive, higher latency magnetic storage media such as hard disk drives (HDDs). However, this is given by way of example and not of limitations as the hybrid storage aggregate may encompass any two or more tiers of the multiple tiers of heterogeneous storage media as discussed above.

At least certain embodiments of the file system improves random read performance by relocating data between one or more tiers of the multiple tiers a heterogeneous physical storage media, such as, between SSDs and HDDs. The file system is configured to perform initial writing of data into persistent storage locations, as well as relocation of data among storage locations of the hybrid storage aggregate to improve overall performance characteristics of the aggregate. The file system may initially store (write) data on any of the different tiers of storage media and thereafter relocate (move) the data between the different tiers without the need for manual enforcement.

FIG. 1 illustrates a schematic block diagram of a storage server that may be advantageously used to implement illustrative embodiments of the invention. In the illustrated embodiment, storage system 100 includes a storage server 120 including one or more processors 122, a memory 124, a network adapter 126, a storage adapter 128 and buffer cache 138 interconnected by a system bus 125. The storage server 120 is a computer that provides storage services relating to the organization of information on writable, persistent storage media, such as SSDs and HDDs. The storage server 120 also includes a storage operating system 200 that implements a file system to logically organize the stored data as a hierarchical structure of logical data containers (e.g., volumes, logical units, directories and/or files) on the electronic storage media 140 and magnetic storage media 150. It will be understood by those skilled in the art that this description may apply to any type of special-purpose computer (e.g., file server or storage serving appliance) or general-purpose computer embodied as, or having a storage server including a standalone computer or portion thereof. Moreover, the teachings of this description can be adapted to a variety of storage server architectures including, but not limited to, a network-attached storage (NAS), storage area network (SAN), or a disk assembly directly-attached to a client or host computer. The term "storage server" should therefore be taken broadly to include such arrangements.

The memory 124 includes storage locations that are addressable by the processor(s) 122 and adapters for storing software programs and data structures to carry out the techniques described herein. Processor(s) 122 and adapters may, in turn, include processing elements and/or logic circuitry configured to execute the software programs and manipulate the data structures. The storage operating system 200, portions of which is typically resident in memory 124 and executed by the processor(s) 122, functionally organizes the storage server by invoking storage operations in support of software processes executing on the server 120. It will be apparent to those skilled in the art that other memory mechanisms, such as various computer-readable media, may instead be used to store and execute program instructions pertaining to the embodiments described herein. The electronic storage media 140 and magnetic storage media 150 are configured to provide a persistent, writable storage space capable of maintaining data in the event of a power loss or other failure of the storage server 120. Accordingly, the electronic storage media 140 and magnetic storage media 150 may be embodied as large-volume memory arrays.

The network adapter 126 includes the mechanical, electrical and signaling circuitry needed to connect the storage server 120 to a client 110 over a computer network 160, which may include a point-to-point (P2P) connection or a shared medium, such as a local area network (LAN). The client 110 may be a general-purpose computer configured to execute applications 112, such as a database application. Moreover, the client 110 may interact with the storage server 120 in accordance with a client/server model of information delivery. That is, the client(s) 110 may request the services of the storage server 120 and the system may return the results of the services requested by the client 110, such as by exchanging packets over the network 160. The client(s) 110 may issue packets including file-based access protocols such as the Common Internet File System (CIFS) protocol or Network File System (NFS) protocol over TCP/IP when accessing information in the form of files. Alternatively, the client(s) 110 may issue packets including block-based access protocols such as the Small Computer Systems Interface (SCSI) protocol encapsulated over TCP (iSCSI) and SCSI encapsulated over FC (FCP) when accessing information in the form of LUNs or blocks.

The storage adapter 128 cooperates with the storage operating system 200 executing on the storage server 120 to access information requested by the client 110. The information may be stored on the electronic storage media 140 and magnetic storage media 150, which are illustratively embodied as SSDs and HDDs. The storage adapter includes input/output (I/O) interface circuitry that couples to the SSD 140 and HDD 150 over an I/O interconnect arrangement, such as a conventional high-performance Fibre Channel serial link topology. The information is retrieved by the storage adapter 128 and, if necessary, processed by the processor(s) 122 (or the adapter 128) prior to being forwarded over the system bus 125 to the network adapter 126 where the information is formatted into a packet and returned to the client 110.

In the illustrated embodiment, buffer cache 138 is coupled with the memory 124 over the system bus 125. However, this is by way of example and not of limitation as the buffer cache 138 may be coupled with the memory using, for example, a point-to-point connection. In addition, the buffer cache 138 may be separate from the memory 124 (as illustrated), part of the memory 124, or part of the processor(s) 122. Generally, a buffer cache memory, such as buffer cache 138, includes a smaller, lower-latency (faster) memory such as RAM (e.g., DRAM), operable to reduce the average time to perform a memory access. The buffer cache typically stores copies of the data from the most frequently used locations in memory 124 so that when a memory access is performed, the buffer cache may first be checked to determine if required data is located therein, and, if so, the data may be accessed from the buffer cache 138 instead of the persistent storage media, such as SSDs or HDDs. In this manner, a buffer cache, such as buffer cache 138, reduces memory access times by avoiding having to access persistent storage to obtain the data.

Figure 2:
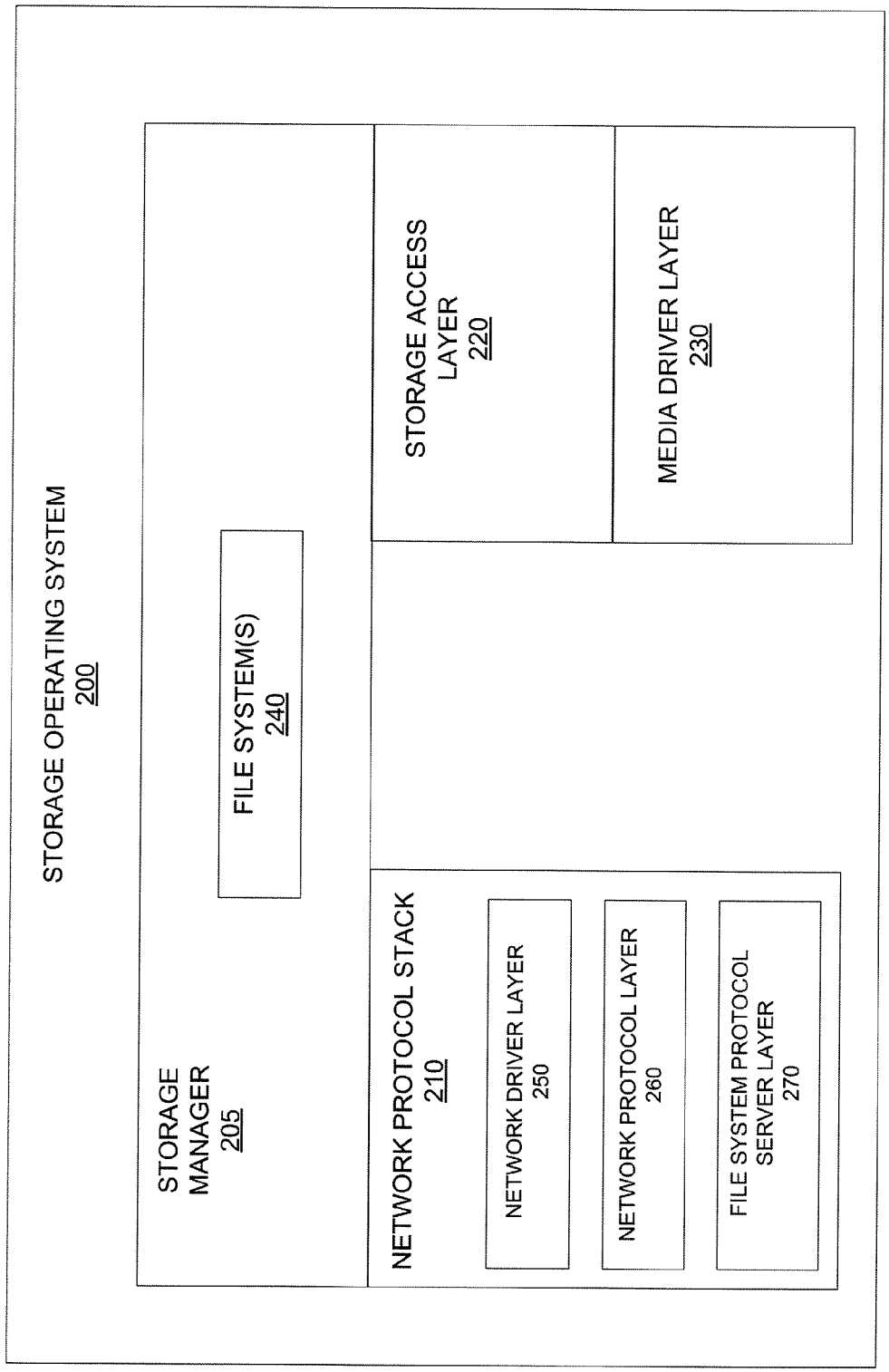
FIG. 2 illustrates a block diagram of a storage operating system according to an illustrative embodiment.

FIG. 2 illustrates a block diagram of a storage operating system according to an illustrative embodiment. As used herein, the term "storage operating system" generally refers to the computer-executable code operable on a computer to perform a storage function that manages data access. The storage operating system can also be implemented as a microkernel, an application program operating over a general-purpose operating system such as UNIX® or Windows NT®, or as a general-purpose operating system configured for the storage applications as described herein. In the illustrated embodiment, the storage operating system includes a network protocol stack 210 having a series of software layers including a network driver layer 250 (e.g., an Ethernet driver), a network protocol layer 260 (e.g., an Internet Protocol layer and its supporting transport mechanisms: the TCP layer and the User Datagram Protocol layer), and a file system protocol server layer 270 (e.g., a CIFS server, a NFS server, etc.). In addition, the storage operating system 200 includes a storage access layer 220 that implements a storage media protocol such as a Redundant Array of Independent Disks (RAID) protocol, and a media driver layer 230 that implements a storage media access protocol such as, for example, a Small Computer Systems Interface (SCSI) protocol. Any and all of the modules of FIG. 2 can be implemented as a separate hardware component. For example, the storage access layer 220 may alternatively be implemented as a parity protection RAID module and embodied as a separate hardware component such as a RAID controller.

Bridging the storage media software layers with the network and file system protocol layers is a storage manager 205 that implements one or more file system(s) 240. In one embodiment, the storage manager 205 implements data layout algorithms that improve read and write performance to the electronic storage media 140 and magnetic storage media 150. For example, storage manager 205 is configured to perform initial placement and relocation of the data among multiple tiers of heterogeneous storage media of a hybrid storage aggregate and to allow clients to access the store data to any subsystems configured to perform the storage functions described herein.

Figure 3A:
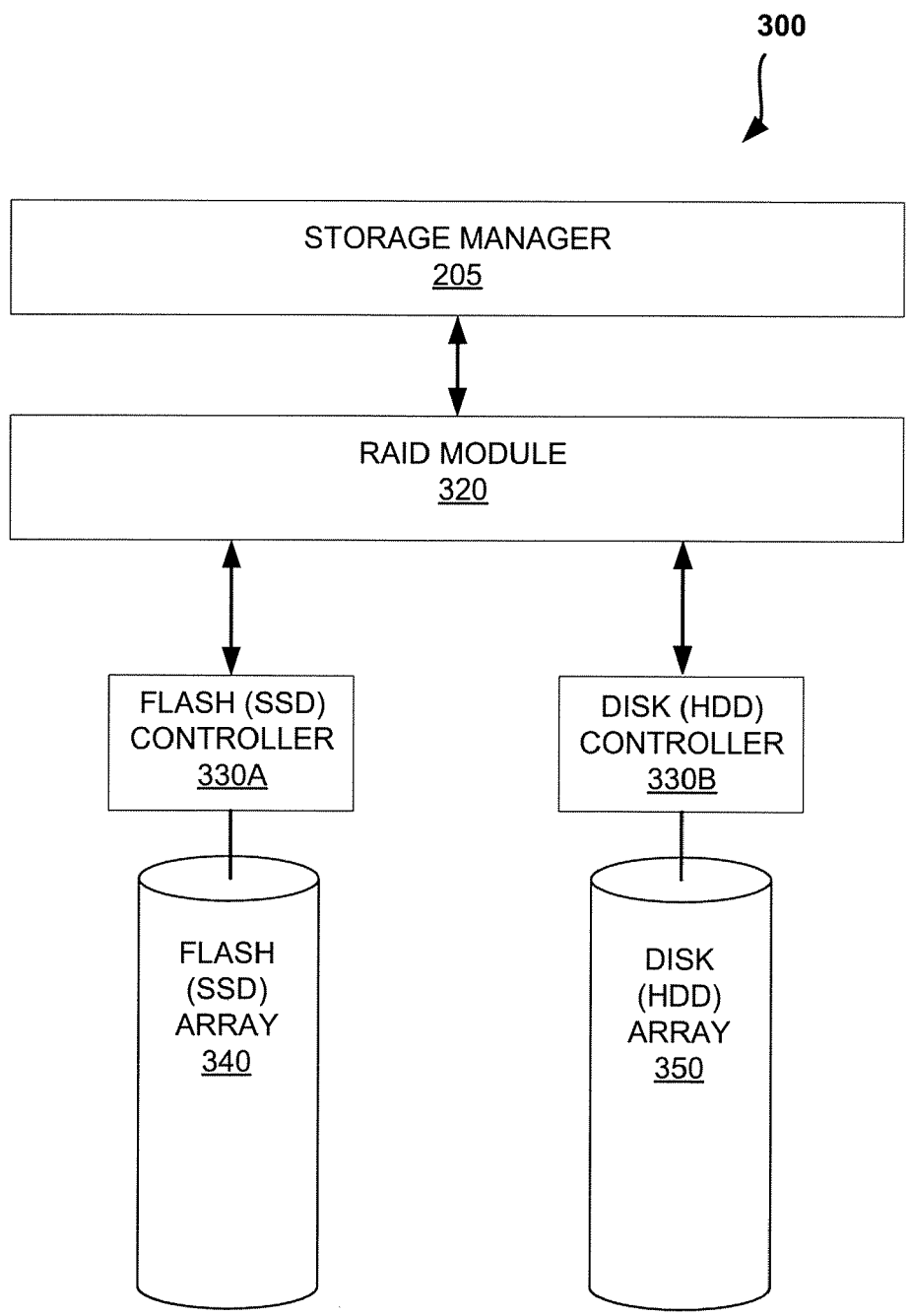
FIG. 3A illustrates a block diagram of a file system according to an illustrative embodiment.

FIG. 3A illustrates a block diagram of an illustrative organization of a hybrid storage aggregate architecture according to one embodiment. In the illustrated embodiment, the hybrid storage aggregate architecture 300 includes a storage manager 205 disposed over a parity protection RAID module 320 to control operation of the multiple tiers of heterogeneous physical storage media, such as flash array 340 (SSDs) and disk array 350 (HDDs). The hybrid storage aggregate encompasses multiple tiers of heterogeneous storage media and includes one or more volumes and having a contiguous volume block number (VBN) space spanning a first-tier and a second-tier of the multiple tiers of heterogeneous storage media to provide a single contiguous storage space of the hybrid storage aggregate 300. In the illustrated in embodiment, the multiple tiers of heterogeneous storage media include a relatively inexpensive, higher latency magnetic storage media 350 constructed using an array of disks such as HDDs, and a relatively expensive, lower latency electronic storage media 340 constructed using an array of non-volatile, flash devices such as SSDs. However, it will be understood by those skilled in the art that other non-volatile storage media may be used in accordance with the teachings of this description. Additionally, FIG. 3A depicts only two (2) tiers of storage media. However, this is given by way of illustration and not of limitation, as any number of tiers of different types of storage media technologies may be combined to construct the multiple tiers of heterogeneous physical storage media of the hybrid storage aggregate 300. Also, as discussed above, the embodiments are not limited to the SSD/HDD configuration.

The storage manager 205 cooperates with a RAID module 320 configured to control the multiple tiers of heterogeneous storage media. As discussed above, a hybrid storage aggregate is defined as a logical aggregation of physical storage (i.e., a logical container for a pool of storage combining one or more physical mass storage devices of different storage media technologies or parts thereof into a single logical storage object), which contains or provides storage for one or more other logical datasets in some logical arrangement of block numbers. In the illustrated embodiment, the hybrid storage aggregate architecture 300 is embodied as a RAID group which may include one or more volumes, were each volume includes a VBN space spanning across two or more tiers of heterogeneous storage media. That is, the logical aggregation of physical storage includes one or more volumes, and the logical arrangement of block numbers are VBNs configured in a contiguous VBN space spanning across the multiple tiers of heterogeneous storage media. Each volume is defined by a VBN space that encompasses the physical storage space of at least two different physical tiers of the multiple tiers of heterogeneous storage media. The RAID module 320 organizes the SSDs/HDDs within a volume as one or more parity groups (e.g., RAID groups) and manages parity placement of data on the SSDs/HDDs of each group. The RAID module 320 further configures RAID groups according to one or more RAID implementations (e.g., RAID 1, 4, 5, 6 and/or RAID-DP) to provide protection over the SSDs/HDDs in the event of failure of one or more of the SSDs/HDDs. The RAID implementation enhances the reliability/integrity of data storage through the writing of data "stripes" across a given number of SSDs/HDDs in a RAID group and the appropriate storing of redundant information (e.g., parity) with respect to the striped data.

Each volume is typically associated with two (2) VBNs for each block of data, e.g., a virtual volume block number (VVBN) and a physical volume block number (PVBN). A VVBN is an address of a logical block of data in a volume and a PVBN is an address of a physical block of data in a volume. The hybrid storage aggregate architecture 300 is further organized as files of a file system such as one or more file system(s) 240; including container files where each container file corresponds to a volume. A file block number (FBN) is the logical position of a block of data within a particular file, and each FBN maps to a VVBN-PVBN pair within a volume. The VVBN identifies the FBN location within the container file such that a block with particular VVBN in the volume can be found at the same FBN in the container file.

Figure 3B:
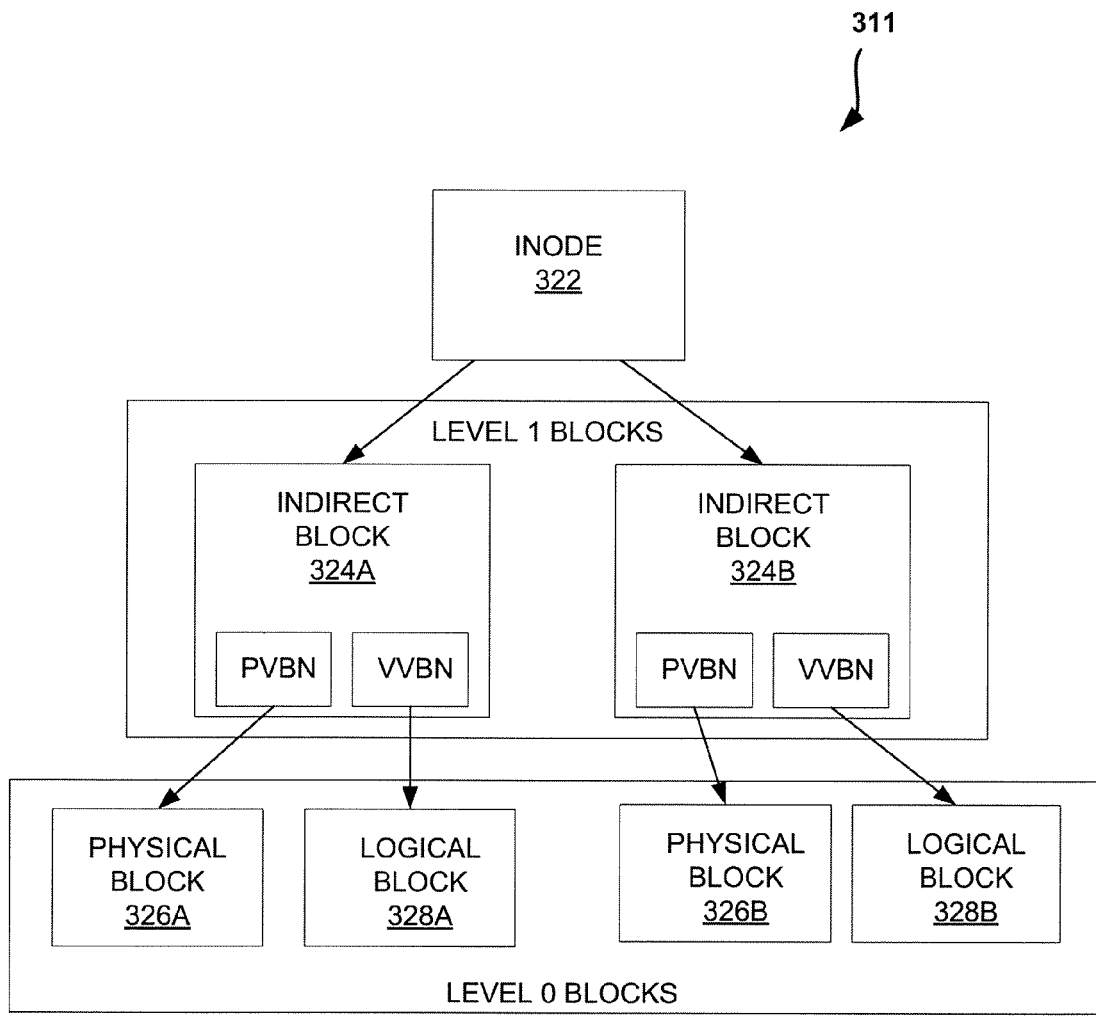
FIG. 3B illustrates an example buffer tree of a container file according to an illustrative embodiment.

FIG. 3B illustrates an example buffer tree of a container file according to an illustrative embodiment. Each file in the hybrid storage aggregate architecture 300 is represented in the form of a buffer tree 311. Buffer tree 311 is a hierarchical metadata structure, which is used to store metadata about a file, including pointers for use in locating the blocks of data in the file. A buffer tree includes one or more levels of indirect blocks (called "L1 blocks," "L2 blocks," and et cetera), each of which contains one or more pointers to lower-level indirect blocks and/or to the direct blocks (called "L0 blocks") of the file. As used herein, a "block" of data is a contiguous set of data of a known length starting at a particular address value. In certain embodiments, each direct (L0) block is 4 kBytes in length. However, a block could be of different sizes and other embodiments. The root of buffer tree 311 is the "inode" of the file. An inode, as the term is used herein, is a metadata container used to store metadata about the file, such as ownership of the file, access permissions for the file, file size, file type, and pointers to the highest-level of indirect blocks for the file. The inode is stored in a separate inode file. In the illustrated embodiment, the file includes an inode 322 referencing Level 1 indirect blocks 324A and 324B. Each indirect blocks stores a least one PVBN and a corresponding VVBN. To simplify this description, only one PVBN-VVBN pair is shown in each indirect blocks 324; however, many PVBN-VVBN pairs may be included in each indirect block 324A and 324B. Each PVBN references a physical block in the hybrid storage aggregate 300 and the corresponding VVBN references the associated logical block number in the volume. In the illustrated embodiment, the PVBN in indirect block 324A references physical block 326A and the PVBN in indirect block 324B references physical block 326B. Likewise, the VVBN in indirect block 324A references logical block 328A and the VVBN in indirect block 324B references logical block 328B. The inode 322 and indirect blocks 324A and 324B are shown pointing to only two lower-level blocks; however, this is given by way of example and not of limitation since inode 322 and indirect blocks 324A and 324B can include a greater number of pointers and refer to a greater number of lower-level blocks.

Each VVBN space is an independent set of numbers that correspond to locations within the container file, which are then translated to disk block numbers (DBNs) of the physical storage media. The storage manager 205 implements a FBN-to-physical storage (e.g., PVBN) mapping. The storage manager 205 further cooperates with the parity protection RAID module 320 (e.g., of media storage layer 220) to control storage operations of the flash array 340 and disk array 350. The storage manager 205 translates each FBN of the container file into a PVBN location within the storage aggregate, from which a block can then be retrieved from a storage device using topology information provided by the RAID module 320. The topology information includes PVBN-to-DBN mappings. The SSD controller 330A and HDD controller 330B export this geometry information of the storage media to the RAID module 320 including a model type and the size (number of blocks) of each device including the DBNs. Each DBN is a logical address corresponding to an actual physical address of the data on the SSD 340 and/or HDD 350 physical storage media. The DBNs are translated (mapped) to physical addresses inside the SSDs 340 and HDDs 350 respectively. The SSD controller 330A and HDD controller 330B perform the DBN-to-physical address mapping and supply this information to the RAID module 320. The translation mapping is performed by each SSD controller 330A and HDD controller 330B of the hybrid media storage architecture 300. The translation mapping is configured to translate (i.e., map) the DBNs to physical addresses of the underlying arrays. The RAID module 320 receives this geometry information of the arrays 340 and 350 from their respective controllers 330A and 330B and uses it to map the PVBNs of each volume to the physical storage locations on the devices. Specifically, the RAID module 320 uses the geometry information provided by the array controllers to map the PVBNs of each volume to the DBNs of each of the storage media devices 340 and 350 of the tiers of the multiple tiers of heterogeneous storage media. The RAID module 320 then exports this topology information containing the PVBN-to-DBN mappings for use by the storage manager 205.

Figure 4:
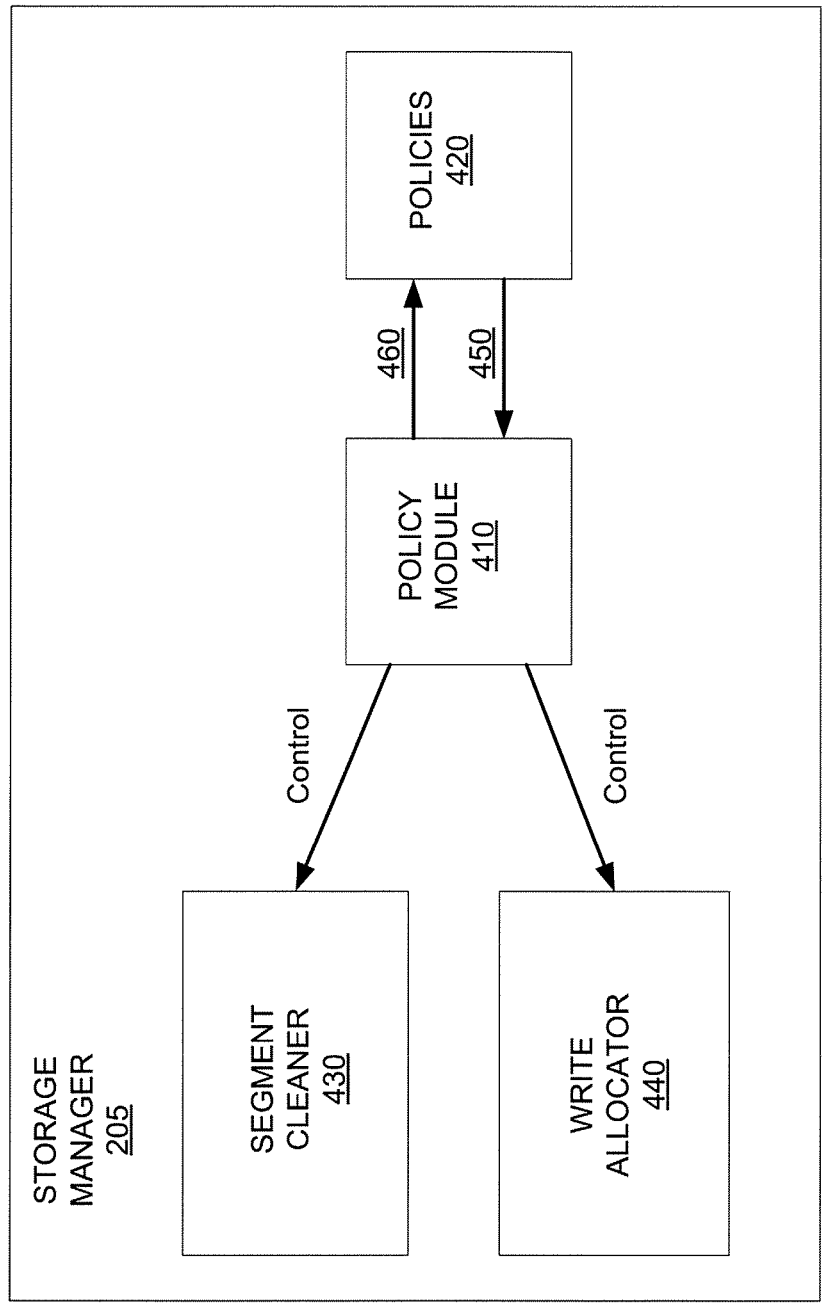
FIG. 4 illustrates a block diagram of an illustrative organization of a hybrid aggregate storage architecture according to one embodiment.

FIG. 4 illustrates a block diagram of a file system according to an illustrative embodiment. In the illustrated embodiment, the storage manager 205 includes a segment cleaner 430, a write allocator 440 and a policy module 410 that implements a set of policies 420. The segment cleaner module 430 is configured to defragment existing data within a same-tier of homogeneous storage media, and, in at least one embodiment, the segment cleaner module 430 is also configured to perform capacity-based relocation of data across the multiple tiers of heterogeneous storage media. In this embodiment, the segment cleaner 430 determines when the available capacity of storage space in one of the multiple tiers of heterogeneous storage media is scarce and relocates data to a different tier with more available capacity. The write allocator module 440 is configured to write blocks of data to unallocated segments of persistent storage whenever the blocks of data have been modified or otherwise updated, and, in at least one embodiment, the write allocator module 440 is also configured to perform access-based relocation of data across the multiple tiers of heterogeneous storage media. Operation of the segment cleaner 430 and write allocator 440 is directed by the policy module 410. The decision as to whether and when to move data between tiers of storage media is determined by the policy module 410 based on the policies 420, which may be dynamically adapted to run-time conditions. In the illustrated embodiment, the policies 420 are input into the policy module 410 over input line 450. The set of policies 420 can be dynamically adapted at run-time to improve the performance characteristics of the hybrid storage aggregate. This includes providing feedback from the policy module 410 to policies 420 over feedback line 460.

Write Allocator Module

The policy module 410 can direct the write allocator 440 to automatically relocate data between tiers of the multiple tiers of heterogeneous storage media during read transactions based on access characteristics of the data. For example, if the first-tier of storage media includes a lower latency storage media than a second-tier of storage media, the policy module 410 can direct the write allocator 440 to automatically relocate data from the second-tier of storage media to the first-tier of storage media when the data is determined to be frequently and/or randomly accessed (i.e., hot data). This is because the first-tier of storage media includes lower-latency storage media which is more suitable for data that is frequently and/or randomly accessed. As another example, assume storage manager 205 initially stores random data in the SSDs of the flash array 340 of FIG. 3A. Subsequently, the random data becomes "cold" (i.e., it is determined to either be infrequently or sequentially accessed). As a result, it is preferable to move this cold data from the SSD storage space to the HDD storage space in order to store other "hot" data in the available SSD storage to improve performance of the hybrid storage aggregate in this case, the policy module 410 can direct the write allocator 440 to automatically relocate data from the first-tier of storage media to the second-tier of storage media. The second-tier of storage media may be less expensive, and therefore, more suitable to mass storage of data that does not require frequent and/or random memory access. Therefore, the hybrid storage aggregate architecture 300 described herein is operable to initially store and relocate frequently accessed (i.e., hot) data in smaller, lower-latency storage (such as flash devices or SSDs) and non-frequently accessed (i.e., cold) data in larger, higher-latency storage (such as SATA disks or HDDs). In one embodiment, data blocks stored in the higher-latency storage media such as HDDs may be relocated during a read transaction if it is determined that these data blocks are frequently and/or randomly accessed from the hybrid storage aggregate. Alternatively, data blocks stored in the lower-latency storage media such as SSDs may be relocated during a read transaction if it is determined that these data blocks are either infrequently accessed or sequentially accessed from the hybrid storage aggregate. In one embodiment, the read transaction is a write-after-read (WAR) transaction.

The set of policies 420 can be dynamically adjusted to adapt to run-time changes in read traffic patterns within the hybrid storage aggregate. One of the policies 420 can include, for example, a policy having a threshold value indicating when a particular block of data becomes "hot." The memory 124 of the storage server 120 can maintain a data structure (not shown) that counts the number of times and or locations of the data accesses from the hybrid storage aggregate, and whenever a particular data block or other "chunk" of data is determined to be accessed above the threshold number of times, that data block or chunk can be identified as frequently and/or randomly accessed. This policy can be adjusted up or down (i.e., to higher or lower threshold values) based on the volume of read transactions actually occurring at run-time. During times when there is a low volume of read traffic, the threshold value indicating when a particular block of data becomes "hot" can be adjusted downward to allow more blocks of data to be relocated from a higher-latency storage medium to a lower-latency storage medium. Likewise, during times when there is a high volume of read transactions, the threshold indicating when a particular block of data becomes "hot" can be adjusted upward to allow fewer blocks of data to be relocated from the higher-latency storage medium to the lower-latency storage medium. One way this can be implemented is using a read transaction "hit rate" (i.e., the fraction of the read transactions that are serviced by the each of the different tiers of storage media) to adapt the access-based policies at run-time. A higher hit-rate implies a higher threshold needed before a block is considered to be "hot." Administrators can also manually control policies 420 via administrator commands (e.g., switching form the "hot block detection" policy to a "move on read" policy where all data that is read from storage is placed into the SSD tier of storage media.

Segment Cleaner Module

In addition, the policy module 410 can direct the segment cleaner 430 to automatically relocate data between tiers of the multiple tiers of heterogeneous storage media based on capacity of the tiers. The policy module 410 can automatically direct the segment cleaner 430 to relocate data between tiers of the multiple tiers of heterogeneous storage media based on the capacity of storage space among each of the tiers. For example, the policy module 410 can direct the segment cleaner 430 to automatically relocate data from a first-tier of storage media to a second-tier of storage media when the first-tier of storage media approaches full-capacity and the second-tier of storage media has sufficient storage capacity. Likewise, the policy module 410 can direct the segment cleaner 430 to relocate data from the second-tier of storage media to the first-tier of storage media whenever the second-tier of storage media approaches full-capacity and the first-tier of storage media has sufficient storage capacity.

The set of policies 420 can be dynamically adjusted to adapt to run-time changes in capacity of the multiple tiers of hybrid storage aggregate. A tier may be considered to be approaching full capacity based on some high-water level percentage, e.g., 80% or 90%, or whatever policy is in effect at the time, and once the high-water level is reached, the policy module 410 can direct the segment cleaner 430 to relocate the data from the tier approaching full capacity to a tier with more available storage capacity. One of the policies 420 can include, for example, a policy to adjust the high-water level indicating when a tier is considered to be approaching full capacity. For example, if there are a large number of tiers with available capacity, the policy module can decrease the high-water level to allow for increased relocation of blocks to improve performance of the hybrid storage aggregate by maintaining lower capacity across each of the multiple tiers. Alternatively, if there are a large number of tiers with little or no storage capacity available, the policy module 420 can increase the high-water level to limit the number of blocks of data being considered for relocated so that blocks of data are not relocated from a tier approaching full capacity to another tier that is also approaching full capacity. In addition, administrators can set capacity thresholds for when and how aggressively to activate capacity-based relocation. In one embodiment there are two (2) thresholds that can be set by the administrator: a "target threshold" and a "limit threshold." When the SSD capacity utilization percentage is less than the target threshold, no capacity-based relocation is performed. For utilization between the target threshold and the limit threshold, the rate is linearly increased until, at utilizations greater than or equal to the limit threshold, the capacity-based relocation is at a maximum. The "rate" of capacity-based relocation is defined as the number of simultaneous relocation requests. In one embodiment, the maximum number of requests is a fixed value.

Access-Based Relocation

Figure 5A:
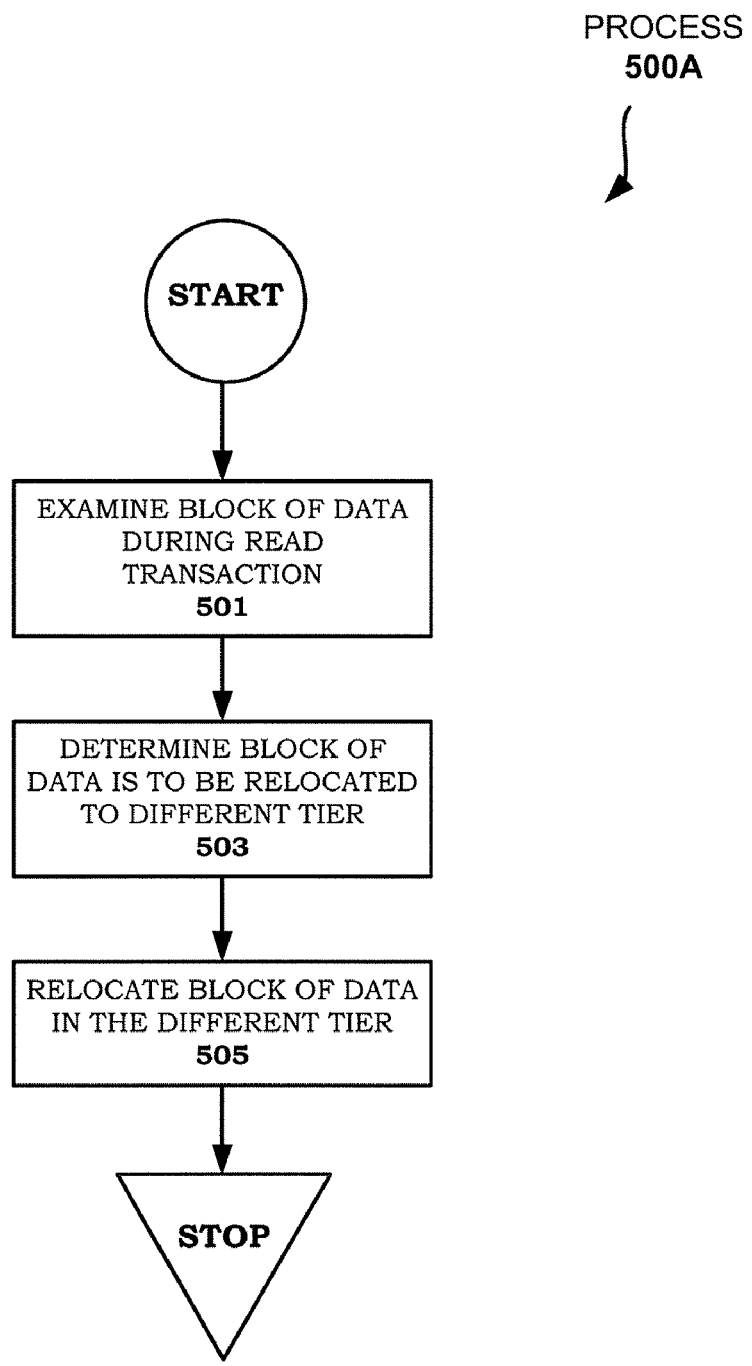
FIG. 5A illustrates a process of access-based relocation of data between tiers of storage media during a read transaction according to an illustrative embodiment.

In this manner, the policy module 410 manages the multiple tiers of heterogeneous storage media to improve the overall performance characteristics of the hybrid aggregate 300 using the set of policies 420 by dynamically adjusting the policies 420 based on run-time conditions without user intervention. At least one embodiment of this process is described with reference to FIGS. 5A-5C in conjunction with FIG. 4. FIG. 5A illustrates a process of access-based relocation of data between tiers of storage media during a read transaction according to an illustrative embodiment. In the illustrated embodiment, process 500A begins by examining a block of data that is being read during a read transaction (operation 501). This is performed by the policy module 410. In one embodiment, the read transaction includes a write-after-read (WAR) transaction. Whenever a user or administrator of the hybrid storage aggregate begins performing read operations, the read transactions are intercepted by the policy module using certain entry points (referred to herein as hooks) into the policy module added to the read and write data paths within the hybrid storage aggregate. In one embodiment, the hooks can be an API of the policy module 410. Process 500A continues with operation 503, where it is determined that a particular block of data is to be relocated to a different tier of the multiple tiers of heterogeneous storage media. The policy module keeps track of the input/output (I/O) pattern of the read data paths and determines whether a particular block of data should be moved based on how frequently and/or randomly the block of data has been accessed.

Once the policy module determines that the particular block of data should be relocated to a different tier of the multiple tiers of heterogeneous storage media, the policy module 410 marks the block with a flag or other indication that the block should be moved to another tier. This flag is then noticed by the write allocator 440 of the hybrid storage aggregate implementation and the block of data is then marked as either "dirty" (or "fake dirty" or to be discussed infra), and further marks the block of data as destined for storage within the different tier of storage media. Marking a block as "dirty" includes setting at least one bit in the block's header to indicate that the block of data has been modified and must be written back to persistent storage so that the modifications can be saved. On the other hand, if a block of data has not been modified, then there is no need to schedule the block to be written back to persistent storage. Rather, these blocks of data may be simply discarded after they are read. Thus, blocks of data that have been modified are marked "dirty" to schedule the blocks to be re-written back to stable storage.

Process 500A continues with relocating the blocks of data in the different tier of storage media (operation 505). In one embodiment, the blocks are stored to an unallocated segment of the different tier. Once a block of data has been marked "dirty" (dirtied), the block of data then follows the same path as any arbitrary block that has been modified and scheduled to be written back into persistent storage. This is performed by the write allocator 440, and the mechanism is called "cleaning," where the dirty blocks are cleaned by the process of "flushing" the blocks back out to persistent storage. This mechanism is used by embodiments described herein to direct the infrastructure to write blocks of data back to persistent storage even though these blocks of data have not been modified (are not really dirty). In order to do so, the policy module 410 marks the blocks of data as dirty (or fake dirty), and further marks the block as destined for storage within the different tier of storage media. The write allocator 440 then checks each of the data blocks, and if marked dirty (or fake dirty), the write allocator 440 flushes the data blocks out to persistent storage. In one embodiment, the dirty or fake dirty blocks are stored in RAM buffers in memory 124 of the storage server 120. These RAM buffers contain buffer headers including certain fields indicating whether the blocks stored therein are dirty.

The fake dirty mechanism works similarly to the dirty mechanism, in that blocks of data marked as fake dirty and destined for storage within the different tier of storage media will be scheduled by the write allocator to be written back to the different tier of storage media. However, marking a data block in a read transaction as dirty causes updates of both the VVBNs and PVBNs of the data blocks. This can be disadvantageous because it is not efficient to update the VVBNs of the data blocks because of its potential impact on a "snapshot" mechanism of the file system. A snapshot is an implementation of a read-only, persistent, point-in-time image (RPPI) of a dataset (and its associated metadata), such as a volume. An RPPI captures the exact state of data in a dataset at the point in time that the RPPI was taken. This allows a state of the dataset to be backed-up and restored from the RPPI in the event, for example, a client error or other data corruption. The ability to store data from in RPPI provides administrators with a simple mechanism to revert the state of their data to a known previous point in time, as captured by the RPPI.

Assume a snapshot is generated by the storage manager 205 and stored in SSDs of the flash array 340. Once captured in a snapshot, the FBN-to-VVBN mapping for data is immutable. That is, once a snapshot is taken at a point in time, the FBN-to-VVBN mapping of each block of data within the snapshot is permanently set and cannot later be modified or otherwise remapped. As a result, previously whenever a block of data was stored in a location and a snapshot was taken of the block of data by the storage manager 205, that snapshot block could not be moved because, in order to do so would require overwriting its contents of the block of data in the snapshot. However, the VVBN-to-PVBN translation associated with volumes is not immutable. Rather, the VVBN-to-PVBN translation associated with volumes is modifiable within each snapshot. In other words, a snapshot renders the FBN-to-VVBN mapping immutable, but leaves the VVBN-to-PVBN mapping modifiable.

This changeable level of mapping provides the ability to relocate aging snapshot data resident in, for example, SSDs to HDDs freeing-up space in the expensive SSDs to store new data that may benefit from the faster access properties of flash storage. This relocation can occur by modifying the VVBN-to-PVBN mapping without having to overwrite the contents of the block of data in a snapshot. Certain embodiments provide a fake dirty mechanism that causes an update only to the PVBNs associated with the data blocks without updating the VVBNs of the data blocks. Thus, the use of fake dirty allows data relocation without the negative impact and additional storage costs for snapshots. This completes process 500A according to an illustrative embodiment.

In addition, some read paths within the hybrid storage aggregate described herein may prefer to decide whether to relocate a particular block of data to a different tier of the storage media before a read operation is finished. In these situations, it may not be possible to mark the block of data as dirty right away, and so a two-phase approach may be implemented where the block of data is first marked as "to be dirtied" (and destined for a different tier of storage media) when the determination is made. Then, when the read operation is completed, the block is examined and moved to a different tier of storage media as determined by the policy module 410 if it is marked "to be dirtied." In this manner, the policy module 410 may proceed without having to be restricted by implementation details of a particular read path. This two-phase approach allows for the marking of blocks as dirty (real or fake) to be decoupled with determining when to relocate a particular block of data to a different tier, and the mechanism by which the relocation is done.

Figure 5B:
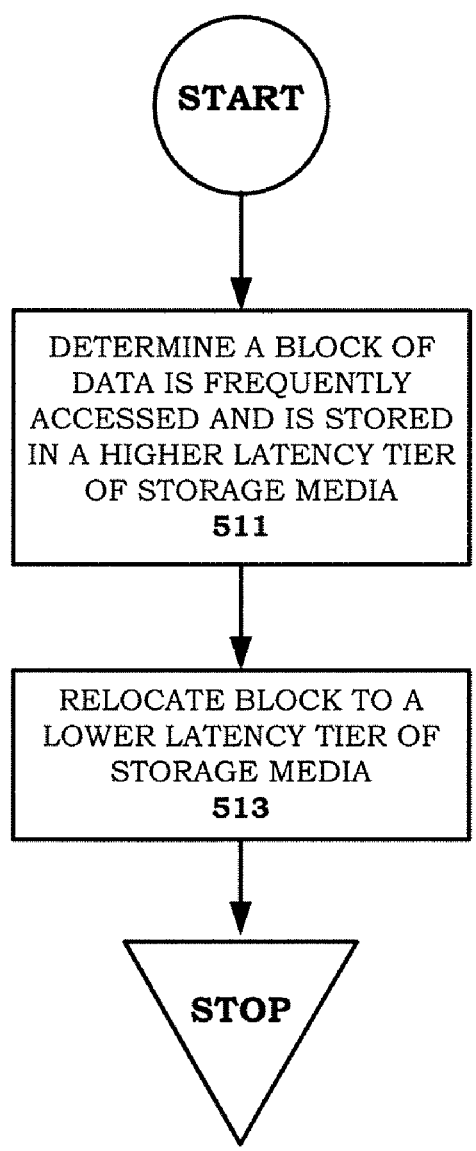
FIG. 5B illustrates a process of relocating data from a higher latency tier of storage media to a lower latency tier of storage media during a read transaction according to an illustrative embodiment.

FIG. 5B illustrates a process of relocating data from a higher-latency tier of storage media to a lower-latency tier of storage media during a read transaction according to an illustrative embodiment. In the illustrated embodiment, process 500B begins by determining a block of data is frequently and/or randomly accessed (i.e., hot) and is presently stored in a higher-latency tier of the multiple tiers of heterogeneous physical storage media (operation 511). A block of data that is being repeatedly read at a high rate and/or randomly read from non-sequential locations of a storage medium is well-suited for storage in a lower-latency tier of storage media. As discussed above, this can be determined by the policy module 410 using the hooks added to the read and write data paths of the hybrid storage aggregate. Whether a block of data is frequently and/or randomly accessed is determined by the set of one or more policies, which may be dynamically adjusted at run-time to account for changes in read traffic patterns. Process 500B continues with relocating the block of data determined to be frequently and/or randomly accessed to a lower-latency tier of storage media (operation 513). In one embodiment, the block of data is stored to an unallocated segment of the lower-latency tier of storage media. This completes process 500B according to an illustrative embodiment.

Figure 5C:
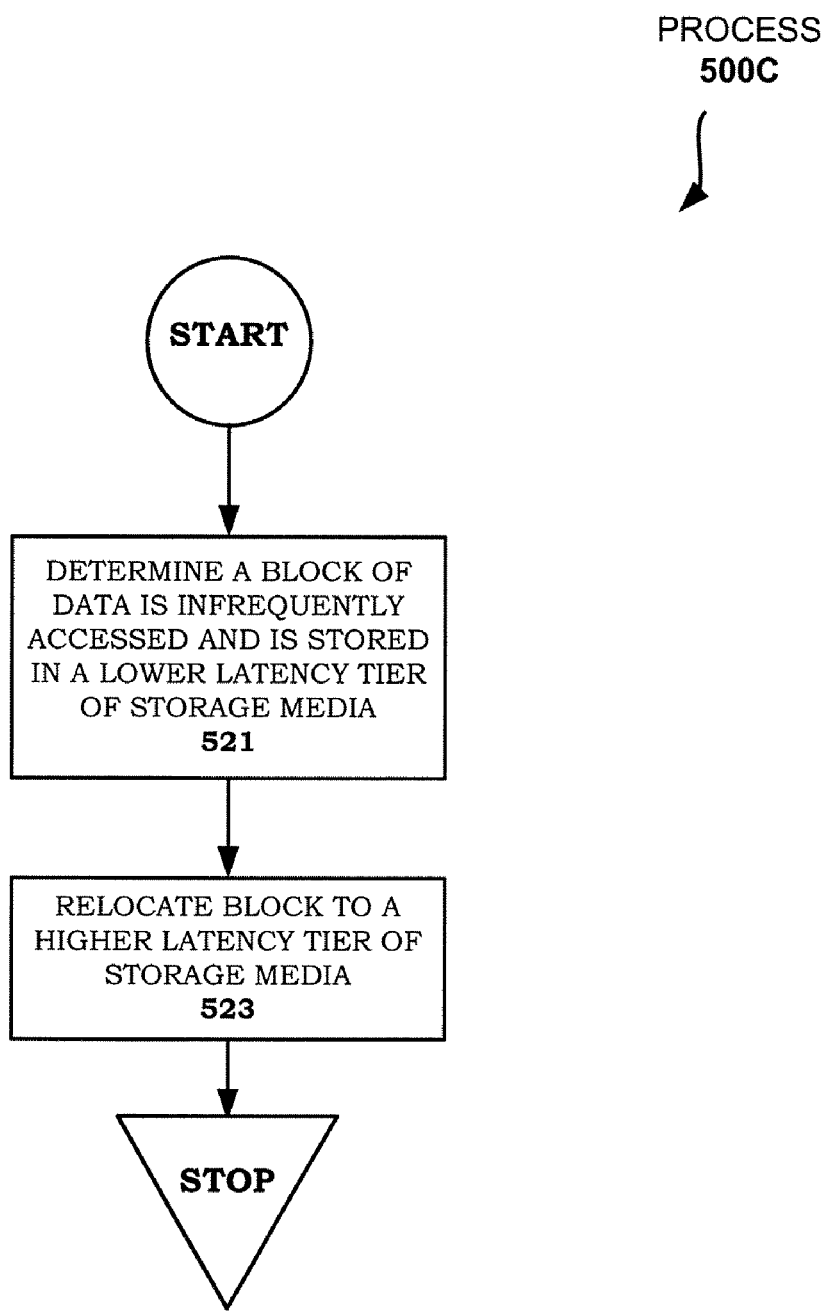
FIG. 5C illustrates a process of relocating data from a lower latency tier of storage media to a higher latency tier of storage media during a read transaction according to an illustrative embodiment.

FIG. 5C illustrates a process of relocating data from a lower-latency tier of storage media to a higher-latency tier of storage media during a read transaction according to an illustrative embodiment. In the illustrated embodiment, process 500C begins by determining a block of data is either infrequently or sequentially accessed from the hybrid storage aggregate (i.e., cold) and is presently stored in the lower-latency tier of the multiple tiers of heterogeneous storage media (operation 521). As discussed above, this is determined by the policy module using the hooks into the policy module added to the read and write paths of the hybrid storage aggregate. Whether a block of data is frequently and/or randomly accessed is determined by the set of one or more policies, which may be dynamically adjusted at run-time to account for changes in read traffic patterns. Process 500C continues with relocating the block of data to a higher-latency tier of storage media (operation 523). In one embodiment, the block of data is stored to an unallocated segment of the higher-latency tier of storage media. This completes process 500C according to an illustrative embodiment.

Capacity-Based Relocation

Figure 6:
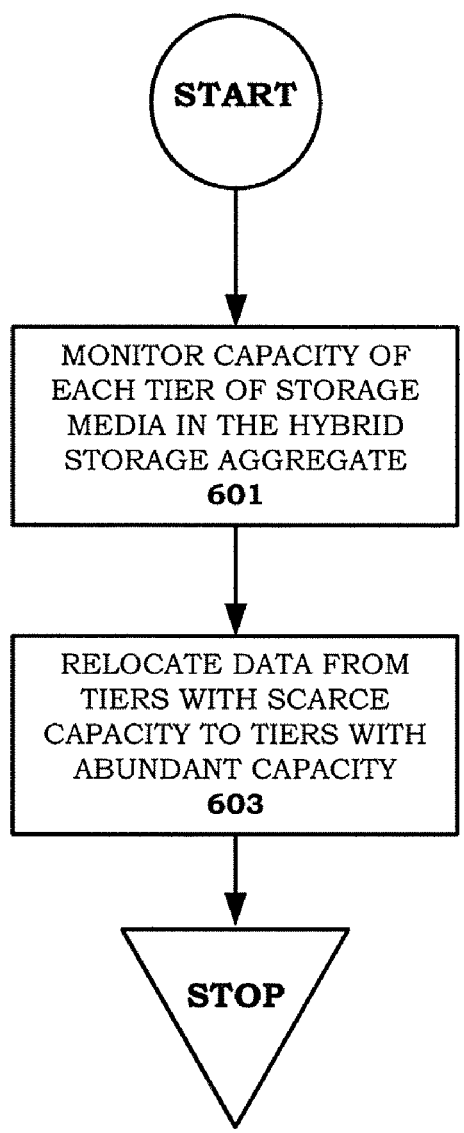
FIG. 6 illustrates a process of capacity-based relocation of data between tiers of storage media according to an illustrative embodiment.

FIG. 6 illustrates a process of capacity-based relocation of data between tiers of storage media according to an illustrative embodiment. As discussed above, the set of policies 420 can include policies for implementing capacity-based data relocation from one tier to another, such that when the available capacity of one tier of the multiple tiers of heterogeneous storage media is scarce, certain data may be relocated to a tier with more available capacity. In at least certain embodiments, the capacity-based relocation of data is performed by the segment cleaner module 430. Process 600 begins with monitoring the capacity of storage space of each tier of the multiple tiers of heterogeneous storage media in the hybrid storage aggregate (operation 601). For example, the segment cleaner 430 can monitor the usage based on the SSDs and HDDs of the hybrid storage aggregate to determine if they are approaching full utilization. If so, process 600 continues with relocating data from the tier of storage media with scarce storage capacity to a tier of storage media with abundant storage capacity (operation 603). In one embodiment, data is relocated from a first-tier of storage media to a second-tier of storage media when the first-tier of storage media approaches full-capacity and the second-tier of storage media has sufficient storage capacity. In addition, data may be relocated back to the first-tier of storage media when the second-tier of storage media approaches full-capacity and the first-tier of storage media has sufficient storage capacity.

As discussed previously, the relocation of data is determined by the policy module 410 based on the set of policies 420. Therefore, determining whether a tier of storage approaches full capacity is based on the set of policies 420, which, as discussed above, may be dynamically adjusted at run-time to improve the performance characteristics of the hybrid storage aggregate. In addition, since in one embodiment the segment cleaner 430 is a background process running transparently to users of the hybrid storage aggregate, it is often preferable to operate the capacity-based relocation of data during times when the storage server is less busy to avoid impact on the performance of the storage server. In at least one embodiment, throttling of capacity-based relocation is performed to make sure the system is not overwhelmed by too aggressively cleaning out data from the various tiers of storage media. This completes process 600 according to an illustrative embodiment.

Cache-Like Functionality

At least certain embodiments allow the hybrid aggregate storage media to operate similarly to a cache memory system, but with certain advantages over conventional cache memories. Referring again to FIG. 1, the illustrated storage system 100 can be viewed as a two-level cache memory, where the buffer cache 138 is the first level of cache memory (e.g., L0 cache) and SSDs 140A and 140B (hereinafter referred to collectively as SSDs 140) are the second level of cache memory (e.g., L1 cache). When copies of the data are stored in both the buffer cache 138 and the SSDs 140, the system effectively functions as a two-level cache memory system (but with certain advantages over conventional cache memories). Incorporating a smaller, lower-latency storage media into the hybrid storage aggregate is functionally similar to incorporating an additional level of cache memory to the storage system. For example, assume one or more "cold" data blocks are identified in the SSDs of the flash array 340 and then relocated to the HDDs of the disk array 350. For a certain period of time thereafter, the metadata associated with the data may indicate the data is still stored in block locations of the SSDs (even though technically the data has been relocated to storage locations of the HDDs). That is, when relocating the data block from one PVBN on a SSD tier of the hybrid storage aggregate to another PVBN on a HDD tier, there may be a period of time before the metadata for the file is updated to point to the PVBN in the HDD. During this period of time, the block's associated metadata still indicates that the data block is located in the SSD. Until the time the file system overwrites block locations of that available space in the SSDs, old data (i.e., data relocated to the HDDs) stored in those block locations is still valid and accessible.

Accordingly, when accessing a data block during this period, the storage manager 205 can read the data block from the SSD tier 340, even though its "official" location is now in the HDD tier 350. The storage manager 205 can exploit this aspect of the hybrid storage aggregate architecture to allow portions of the hybrid media storage server to function like a cache memory since the data can be read from the lower-latency SSDs 340 without having to perform an additional read transaction to access the data from the higher-latency HDD 350. The storage system 100, therefore, behaves like a cache system in that it exploits this property of the hybrid storage aggregate architecture to avoid the latency involved with accessing data within the HDDs (i.e., to avoid one or more I/O operations to the HDDs) until the metadata pointers are updated. During this period of time, data accesses may be fulfilled by accessing the old data stored in the smaller, lower-latency, STD tier 340, rather than having to access the same data stored in the larger, higher-latency HDD tier 350. Thus, incorporating a smaller, lower-latency tier of storage media into the hybrid storage aggregate causes the hybrid storage aggregate to function like a cache memory system, but with certain advantages over conventional cache memory systems.

Fail-Over Protection

One advantage of the cache-like functionality is that typically a cache memory is volatile (e.g., RAM), so all the information stored in a conventional cache will be lost when the cache memory system is rebooted or has a system failure. By incorporating the lower-latency tiers of storage media in the hybrid storage aggregate, the cache-like functionality discussed above is achieved, while having at least one level of cache within persistent storage that is resilient against crashes and rebooting the system. This is because persistent storage media is inherently non-volatile and stable during or after a system failure. As a result, during a system failure, for example, the data stored in the RAM cache memory, such as buffer cache 138 may be lost, while the data stored in the lower-latency, writeable persistent storage media will not be lost.

An additional advantage over conventional cache memory systems is that a fail-over partner (i.e., a partner storage server coupled with the storage server 120 to prevent the impact of a system failure) has access to the tiers of storage media of the storage server 120 and vice versa. In a fail-over partner system design, a first partner system, when it takes over the hybrid storage aggregate upon failure of the second partner system, can access the data stored in the second partner's persistent storage media even after a system crash or other failure. By incorporating the above cache-like functionality into the hybrid storage aggregate of each partner, failure-resilient cache-like functionality is achieved because the fail-over partners have access to copies of the data stored in the first-level of cache memory, such as the data stored in buffer cache 138, by virtue of their having access to the same copies of data located in the second-level of cache memory, such as the data stored in non-volatile persistent storage.

Figure 7:
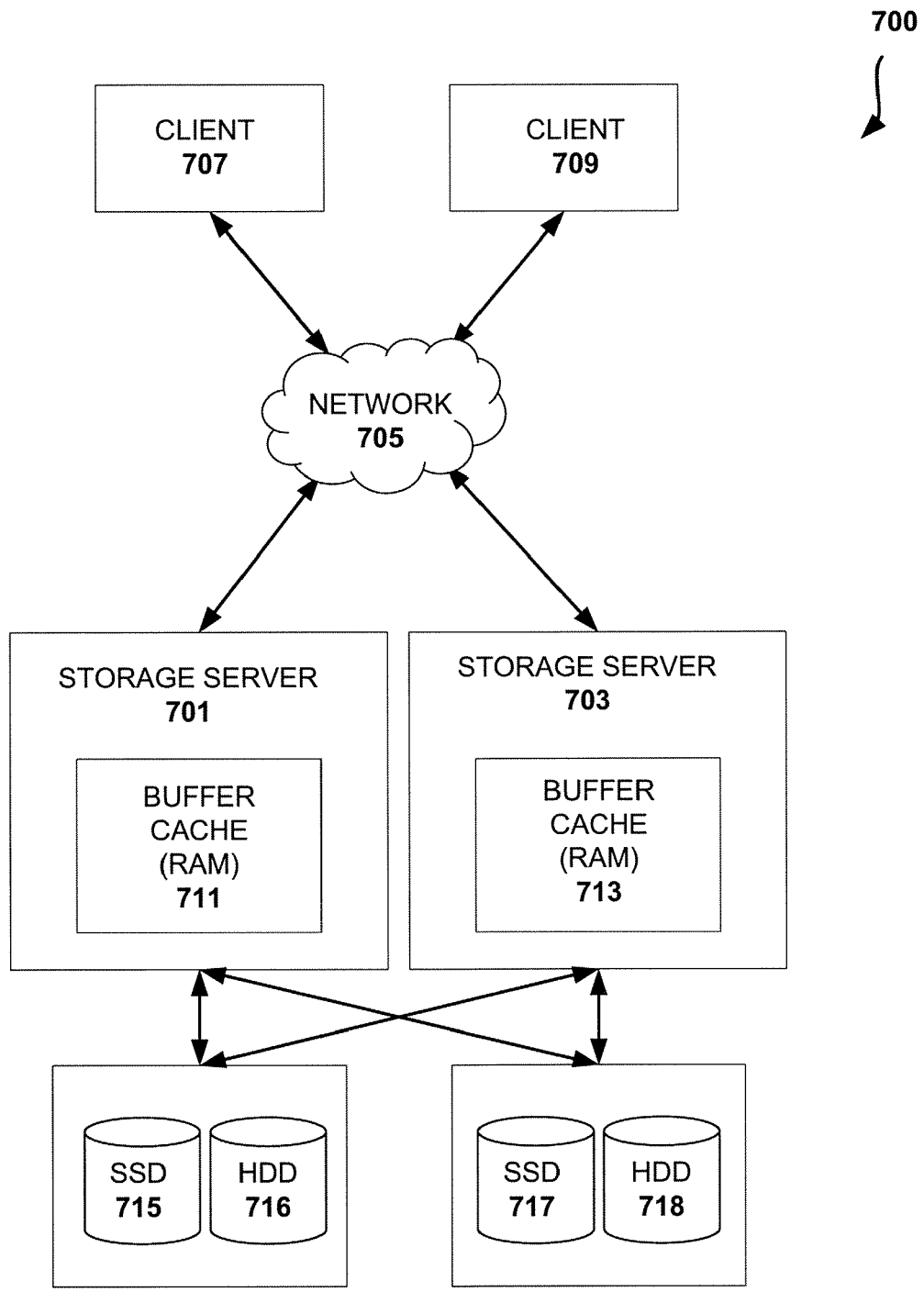
FIG. 7 illustrates a block diagram depicting partnering storage servers for failover protection according to an illustrative embodiment.

FIG. 7 illustrates a block diagram depicting partnering storage servers for failover protection according to an illustrative embodiment. In the illustrated embodiment, a fail-over system 700 includes fail-over partners storage server 701 and 703 connected to clients 707 and 709 across network 705 respectively. Storage server 701 includes buffer cache 711 and hybrid storage aggregate including SSD 715 and HDD 716. Likewise, storage server 703 includes buffer cache 713 and a hybrid storage aggregate including SSD 717 and HDD 718. In at least certain embodiments, whenever one of the fail-over partners 701 or 703 encounters a system failure, the other fail-over partner 703 or 701 has access to the hybrid storage aggregate of its partner to enable access to the data stored therein. Since the buffer caches 711 and 713 are local to each particular storage node 701 and 703 respectively, their respective fail-over partners do not have access to these buffer cache memories in the event of a system crash or other power failure. Therefore, the cache-like properties of the hybrid storage aggregate described herein enable each of the storage servers 701 and 703 to effectively have a back-up cache memory stored in non-volatile persistent storage media that may be accessed by the fail-over partner in the event of a system crash or other failure. The failover partner may then start serving data after a system failure. In this manner, either fail-over partner 701 or 703 has access to the data stored in the cache-like hybrid storage aggregate of its partner.

The foregoing description has been directed to specific embodiments of this invention. It will be apparent to persons of skill in the art; however, that other variations and modifications may be made to the described embodiments, while maintaining some or all of their advantages. For example, it will be apparent from this description that aspects of the present invention may be embodied, at least in part, in software, hardware, firmware, or in combination thereof. The techniques described herein may be carried out in a computer system or other data processing system in response to its processor, such as a microprocessor, executing sequences of instructions contained in a memory, such as a ROM, volatile RAM, non-volatile memory, cache memory, or other remote storage device memory. In various embodiments, hardwired circuitry may be used in combination with software instructions to implement this present description. Thus, the techniques are not limited to any specific combination of hardware circuitry and/or software, or to any particular source for the instructions executed by a data processing system Additionally, the apparatuses described herein may be specially constructed for the required purposes, or they may comprise a general purpose computer selectively activated or configured by a computer program stored in a memory of the computer. Such a computer program may be stored in a computer-readable medium. A computer-readable medium can be used to store software instructions, which when executed by a data processing system, causes the system to perform the various methods of this description. A computer-readable medium may include any mechanism that provides information in a form accessible by a machine (e.g., a computer, network device, personal digital assistant, or any device with a set of one or more processors). For example, a computer-readable medium may include any type of disk including floppy disks, hard drive disks (HDDs), solid-state devices (SSDs), optical disks, CD-ROMs, and magnetic-optical disks, ROMs, RAMs, EPROMs, EEPROMs, other flash memory, magnetic or optical cards, or any type of media suitable for storing instructions in an electronic format.

Throughout the foregoing description, for the purposes of explanation, numerous specific details were set forth in order to provide a thorough understanding of the invention. It will be apparent, however, to one skilled in the art that the invention may be practiced without some of these specific details. In addition, embodiments of the invention may include various operations as set forth above, or fewer operations or more operations, or operations in an order which is different from the order described herein. Accordingly, the scope and spirit of the invention should be judged in terms of the claims which follow as well as the legal equivalents thereof.

What is claimed is:

1. A method comprising:
examining data in a hybrid storage aggregate encompassing multiple tiers of heterogeneous physical storage media using a policy module based on a set of policies that are dynamically adjusted by the policy module to adapt to changes at run-time to improve performance characteristics of the hybrid storage aggregate, the hybrid storage aggregate including a volume having a contiguous volume block number space spanning a first-tier and a second-tier of the multiple tiers of heterogeneous physical storage media;
determining that the data is to be relocated to a different tier of physical storage media based on the set of policies; and
relocating the data to the different tier of physical storage media.

2. The method of claim 1, wherein the first-tier of physical storage media and the second-tier of physical storage media include writable, persistent storage media, and wherein the first-tier of storage media is a lower latency storage media than the second-tier of storage media.

3. The method of claim 2, wherein the first-tier of storage media comprises an electronic storage medium and the second-tier of storage media comprises a magnetic storage medium.

4. The method of claim 3, wherein the electronic storage medium comprises a solid-state device (SSD) and the magnetic storage medium comprises a hard disk device (HDD).

5. The method of claim 1, wherein the examining of the data is performed during read transactions and the changes at run-time include changes in read traffic patterns within the hybrid storage aggregate.

6. The method of claim 5, further comprising determining the data is to be relocated to a lower-latency tier of physical storage media when the data has been one or more of frequently and randomly accessed in read transactions.

7. The method of claim 5, further comprising determining that the data is to be relocated to a higher-latency tier of physical storage media when the data has been either infrequently or sequentially accessed in read transactions.

8. The method of claim 5, wherein the read transactions are write-after-read (WAR) transactions.

9. The method of claim 1, wherein the examining of the data is performed by a segment cleaner module running transparently to a user of the hybrid storage aggregate and the changes at run-time include changes in capacity of storage space among the multiple tiers of heterogeneous physical storage media.

10. The method of claim 9, further comprising:
monitoring the capacity of storage space of each tier of the multiple tiers of heterogeneous physical storage media; and
relocating data from the first-tier of storage media to the second-tier of storage media when the first-tier of storage media approaches full-capacity and the second-tier of storage media has sufficient storage capacity.

11. A method comprising:
dynamically adjusting a set of policies at run-time using a policy module within a storage server to improve performance characteristics of a hybrid storage aggregate, wherein the hybrid storage aggregate includes multiple tiers of heterogeneous storage media, each tier comprising a different storage media technology, the hybrid storage aggregate including a volume having a contiguous volume block number space spanning a first-tier and a second-tier of the multiple tiers of heterogeneous storage media;
examining data in the hybrid storage aggregate using the policy module based on the set of policies;
determining that the data is to be relocated to a different tier of storage media based on the set of policies; and
automatically relocating the data to the different tier of storage media in response to the determining.

12. The method of claim 11, wherein the first-tier of storage media and the second-tier of storage media include writable, persistent storage media, and wherein the first-tier of storage media is a lower latency storage media than the second-tier of storage media.

13. The method of claim 11, wherein examining the data is performed during a read transaction, and wherein the set of policies includes an access-based policy derived from read traffic patterns within the hybrid storage aggregate.

14. The method of claim 13, further comprising:
determining the data is to be relocated to a lower-latency tier of storage media when the data has been one or more of frequently and randomly accessed in the read transactions; and
determining the data is to be relocated to a higher-latency tier of storage media when the data has been either infrequently or sequentially accessed in the read transactions.

15. The method of claim 14, further comprising:
marking a header associated with the block of data in the read transaction as dirty; and
marking the header associated with the block of data as destined to the different tier of storage media.

16. The method of claim 15, further comprising:
marking the header associated with the block of data in the read transaction as fake dirty to update only a physical volume block number associated with the block of data without requiring an update to a virtual volume block number associated with the block of data; and
marking the header associated with the block of data as destined to the different tier of storage media.

17. The method of claim 16, further comprising:
checking the header associated with the block of data to determine if it is marked dirty or fake dirty; and
moving the block of data to the different tier of storage media when the header is marked dirty or fake dirty.

18. The method of claim 11, wherein the examining of the data is performed by a module running transparently to a user of the hybrid storage aggregate and wherein the set of policies includes a capacity-based policy derived from capacity of storage space of the multiple tiers of heterogeneous storage media.

19. The method of claim 18, further comprising:
monitoring the capacity of storage space of the multiple tiers of heterogeneous storage media; and
relocating data from the first-tier of storage media to the second-tier of storage media when the first-tier of storage media approaches full-capacity and the second-tier of storage media has sufficient storage capacity.

20. A storage system comprising:
a processor;
a hybrid storage aggregate encompassing multiple tiers of heterogeneous physical storage media and including a volume having a contiguous volume block number space spanning a first tier and a second tier of the multiple tiers of heterogeneous physical storage media; and
a memory coupled with the processor having a storage manager stored therein, the storage manager operable by the processor to automatically relocate data between tiers of the multiple tiers of heterogeneous physical storage media within the hybrid storage aggregate based on a set of policies that are dynamically adjusted to improve performance characteristics of the hybrid storage aggregate.

21. The storage system of claim 20, wherein the storage manager includes:
a write allocation module configured to perform access-based relocation of data within the hybrid storage aggregate during read operations;
a segment cleaner module running transparently to a user of the hybrid storage aggregate, the segment cleaner module configured to perform capacity-based relocation of data within the hybrid storage aggregate; and
a policy module configured to make policy decisions based on the set of policies stored in the memory and to control operation of the write allocation and segment cleaner modules based on the policy decisions.

22. The storage system of claim 21, wherein the first tier of physical storage media is to store data that is one or more of frequently and randomly accessed and the second-tier of physical storage media is to store data that is either infrequently or sequentially accessed.

23. The storage system of claim 22, wherein the first tier of storage media is a low-latency storage media having performance characteristics superior to the performance characteristics of the second tier of storage media.

24. The storage system of claim 23, wherein the first tier of storage media comprises a writeable, persistent electronic storage media and the second tier of storage media comprises a writeable, persistent magnetic storage media.

25. An apparatus comprising:
a hybrid storage aggregate including:
multiple tiers of heterogeneous storage media, each tier including a different storage media technology, wherein the hybrid storage aggregate includes a volume having a volume block number space spanning a first tier of storage media and a second tier of storage media of the multiple tiers of heterogeneous storage media;
a control module coupled with the hybrid storage aggregate to cooperatively manage the multiple tiers of heterogeneous storage media; and
a policy module coupled with the control module, the policy module configured to make policy decisions based on a set of policies that are dynamically adjusted based on read traffic patterns within the hybrid storage aggregate and to automatically relocate data between different tiers of the multiple tiers of heterogeneous storage media based on the policy decisions.

26. The apparatus of claim 25, wherein the first tier of storage media is a lower-latency storage media than the second tier of storage media.

27. The apparatus of claim 26, wherein the control module is a RAID module.

28. The apparatus of claim 26, further comprising a write allocator, wherein the policy module directs the write allocator to automatically relocate data between tiers of the multiple tiers of heterogeneous storage media during read transactions based on access characteristics of the data.

29. The apparatus of claim 28, wherein the policy module directs the write allocator to automatically relocate data from the second-tier of storage media to the first-tier of storage media when the data is determined to be one or more of frequently and randomly accessed, and to automatically relocate data from the first-tier of storage media to the second-tier of storage media when the data is determined to be either infrequently or sequentially accessed.

30. The apparatus of claim 27, further comprising a segment cleaner, wherein the policy module directs the segment cleaner to automatically relocate data between tiers of the multiple tiers of heterogeneous storage media based on capacity of storage space among the tiers of storage media.

31. The apparatus of claim 30, wherein the policy module directs the segment cleaner to automatically relocate data from the first-tier of storage media to the second-tier of storage media when the first-tier of storage media approaches full-capacity and the second-tier of storage media has sufficient storage capacity.

* * * * *